(12) United States Patent
Zou et al.

(10) Patent No.: US 12,187,489 B2
(45) Date of Patent: Jan. 7, 2025

(54) OBJECT CARRYING ASSEMBLY AND TRANSFER ROBOT

(71) Applicant: Shanghai Quicktron Intelligent Technology Co., Ltd., Shanghai (CN)

(72) Inventors: Yangwei Zou, Shanghai (CN); Sheng Pan, Shanghai (CN); Xinhao Wang, Shanghai (CN); Yundi He, Shanghai (CN); Wei Yang, Shanghai (CN)

(73) Assignee: Shanghai Quicktron Intelligent Technology Co., Ltd., Shanghai (CN)

( * ) Notice: Subject to any disclaimer, the term of this patent is extended or adjusted under 35 U.S.C. 154(b) by 236 days.

(21) Appl. No.: 17/799,908

(22) PCT Filed: Jan. 8, 2021

(86) PCT No.: PCT/CN2021/070885
§ 371 (c)(1),
(2) Date: Aug. 15, 2022

(87) PCT Pub. No.: WO2022/057169
PCT Pub. Date: Mar. 24, 2022

(65) Prior Publication Data
US 2023/0099473 A1 Mar. 30, 2023

(30) Foreign Application Priority Data

Sep. 21, 2020 (CN) .......................... 202022086578.7
Sep. 21, 2020 (CN) .......................... 202022086696.8

(51) Int. Cl.
*B65D 19/38* (2006.01)
*B25J 5/00* (2006.01)
*B25J 11/00* (2006.01)

(52) U.S. Cl.
CPC .............. *B65D 19/38* (2013.01); *B25J 5/007* (2013.01); *B25J 11/00* (2013.01); *B65D 2519/00288* (2013.01); *B65D 2519/00293* (2013.01)

(58) Field of Classification Search
CPC .......... B65D 19/38; B65D 2519/00288; B65D 2519/00293; B25J 5/007; B25J 11/00
(Continued)

(56) References Cited

U.S. PATENT DOCUMENTS 4,015,710 A * 4/1977 Biggs ..................... B65D 19/44
248/346.02
4,062,300 A * 12/1977 Real ................... B65D 19/0022
108/55.3
(Continued)

FOREIGN PATENT DOCUMENTS

| CN | 205968395 U | 2/2017 |
|---|---|---|
| CN | 109341569 A | 2/2019 |

(Continued)

OTHER PUBLICATIONS

International Search Report for PCT/CN2021/070885 dated Mar. 11, 2021 with English translation (6 pages).
(Continued)

*Primary Examiner* — Jose V Chen
(74) *Attorney, Agent, or Firm* — Polsinelli PC; Derek D. Donahoe (57) ABSTRACT

An object carrying assembly and a transfer robot. The object carrying assembly (100) comprises: an object carrying component, which comprises two opposite boundary portions; and clamping and bearing members (120), wherein the clamping and bearing members (120) are arranged at the two boundary portions and are rotationally connected to the object carrying component, and the clamping and bearing
(Continued)

members (120) are provided with bearing members (121) and clamping claws (122) on two sides of a rotating shaft (130), respectively. When the object carrying component is empty, the bearing members (121) are at least partially higher than a bearing surface of the object carrying component, and when the object carrying component is loaded, the bearing members (121) are not higher than the bearing surface, and the clamping claws (122) are higher than the bearing surface. The object carrying assembly and the transfer robot can prevent cargo from falling off of same due to factors such as uneven ground or an excessively high carrying speed, such that the carrying efficiency can be improved.

20 Claims, 7 Drawing Sheets (58) Field of Classification Search
USPC .................................. 108/55.1, 55.3, 55.5
See application file for complete search history.

(56) References Cited

U.S. PATENT DOCUMENTS

| | | | | |
|---|---|---|---|---|
| 4,529,217 | A | 7/1985 | Wood | |
| 4,774,892 | A * | 10/1988 | Ballard | B25B 11/00 |
| | | | | 108/55.3 |
| 4,784,194 | A * | 11/1988 | Danner | E02F 3/303 |
| | | | | 108/55.3 |
| 4,848,247 | A * | 7/1989 | Kuipers | B65D 19/44 |
| | | | | 108/55.3 |
| 4,887,537 | A * | 12/1989 | Kellogg | B65D 77/0466 |
| | | | | 108/55.3 |
| 5,080,023 | A * | 1/1992 | Miura | B65D 19/44 |
| | | | | 108/55.3 |
| 5,174,701 | A | 12/1992 | Small | |
| 5,772,369 | A * | 6/1998 | Lerman | B65D 19/44 |
| | | | | 108/55.5 |
| 7,044,066 | B1 * | 5/2006 | Miller | B65D 19/44 |
| | | | | 108/55.3 |
| 7,549,529 | B2 * | 6/2009 | Dreisbach | B21B 39/00 |
| | | | | 108/57.32 |
| 9,284,107 | B2 * | 3/2016 | Schultz | B65D 81/02 |
| 11,322,678 | B1 * | 5/2022 | Sting | H01L 31/18 |
| 2002/0195027 | A1 * | 12/2002 | Mallan | B65D 19/44 |
| | | | | 108/55.3 |
| 2004/0016373 | A1 * | 1/2004 | Bodde | B65D 19/44 |
| | | | | 108/55.5 |
| 2004/0103826 | A1 * | 6/2004 | Ponzio | B23Q 7/1426 |
| | | | | 108/55.3 |
| 2004/0234354 | A1 | 11/2004 | Halliar | |
| 2011/0061572 | A1 * | 3/2011 | Liu | B65D 19/001 |
| | | | | 108/55.5 |
| 2014/0090581 | A1 * | 4/2014 | Schultz | B65D 19/0095 |
| | | | | 248/634 |
| 2015/0291306 | A1 * | 10/2015 | Redman | B65G 60/00 |
| | | | | 248/154 |
| 2016/0221716 | A1 * | 8/2016 | Embleton | H05K 7/20163 |

FOREIGN PATENT DOCUMENTS

| | | | | |
|---|---|---|---|---|
| CN | 210392959 U | | 4/2020 | |
| CN | 111232530 A | | 6/2020 | |
| CN | 111453381 A | | 7/2020 | |
| CN | 211002515 U | | 7/2020 | |
| CN | 115108078 A | * | 9/2022 | |
| DE | 3444320 C1 | * | 2/1986 | |
| EP | 0242076 A2 | * | 10/1987 | |
| EP | 1277663 A2 | | 1/2003 | |
| FR | 2898109 A1 | * | 9/2007 | ......... B65D 19/0016 |
| JP | S 44-9140 Y | | 4/1969 | |
| JP | S 57-152037 U | | 9/1982 | |
| JP | 2006273389 A | | 10/2006 | |
| JP | 2008213867 A | | 9/2008 | |
| JP | 4973240 B2 | | 7/2012 | |
| JP | 2014037243 A | | 2/2014 | |
| JP | 6064428 B2 | | 1/2017 | |
| WO | WO-2022057169 A1 | * | 3/2022 | ............. B25J 11/00 |

OTHER PUBLICATIONS

Japanese Patent Office, Notice of Reasons for Refusal, issued for Japanese Application No. 2022-536651, mailed Jul. 25, 2023 ( 9 pages).

European Patent Office, Extended European Search Report, issued in connection with co-pending European Application No. 21868010. 6, mailed Dec. 14, 2023.

* cited by examiner

OBJECT CARRYING ASSEMBLY AND TRANSFER ROBOT

The present application claims the priority to a Chinese Patent Application No. 202022086578.7, filed with the China National Intellectual Property Administration on Sep. 21, 2020 and utility-model entitled "object carrying assembly and transfer robot," which is incorporated into the present application by reference in its entirety. And, the present application claims the priority to a Chinese Patent Application No. 202022086696.8, filed with the China National Intellectual Property Administration on Sep. 21, 2020 and utility-model entitled "object carrying assembly and transfer robot," which is incorporated into the present application by reference in its entirety.

TECHNICAL FIELD

The present disclosure relates to the technical field of automation equipment, and particularly to an object carrying assembly and a transfer robot.

BACKGROUND

A transfer robot is basically equipped with an object carrying platform for placing a cargo. In the process of carrying the cargo by the transfer robot, the cargo is usually placed directly on the object carrying platform, such that the cargo is easy to fall off the object carrying platform when a road surface is uneven or a carrying speed of the transfer robot is fast, thereby reducing the carrying efficiency.

SUMMARY

Embodiments of the present disclosure provide an object carrying assembly and a transfer robot, in order to solve or mitigate one or more technical problems in the related art.

To achieve the above purpose, the present disclosure adopts the following technical solutions:

As an aspect of embodiments of the present application, an embodiment of the present disclosure provides an object carrying assembly, including:

an object carrying member, including two opposing boundary portions;

a clamping and bearing member, arranged at each of the two boundary portions and rotatably connected to the object carrying member, wherein the clamping and bearing member is provided with a bearing member and a clamping jaw respectively on two sides of a rotating shaft, wherein, when the object carrying member is not loaded, the bearing member is at least partially higher than a bearing surface of the object carrying member; and when the object carrying member is loaded, the bearing member is not higher than the bearing surface and the clamping jaw is higher than the bearing surface.

In an implementation, the object carrying member is an object carrying board, the two opposite boundary portions are two opposite side edges of the object carrying board, and each of the two opposite side edges of the object carrying board is provided with at least one mounting groove respectively, and the clamping and bearing member is arranged in the mounting groove and is rotatably connected to a groove wall of the mounting groove.

In an implementation, the object carrying member is at least one object carrying arm, the two opposing boundary portions are end portions of the object carrying arm, there are two clamping and bearing members, and the two clamping and bearing members are arranged at the end portions of the object carrying arm respectively and are rotatably connected to a wall body of the object carrying arm.

In an implementation, a distance between the rotating shaft and an end portion of the bearing member is smaller than a distance between the rotating shaft and an end portion of the clamping jaw; or, a center of gravity of the clamping and bearing member is set away from the rotating shaft.

In an implementation, a center of gravity of the clamping and bearing member is set at an end portion of the clamping and bearing member away from the rotating shaft.

In an implementation, the clamping jaw includes a bearing portion and a clamping portion, the bearing portion is coplanar with the bearing member, the clamping portion protrudes out of a surface of the bearing portion from an end portion of the bearing portion away from the rotating shaft.

In an implementation, a top portion of the clamping portion is formed with a first inclined surface, and the first inclined surface is inclined downward from a top end of the clamping portion to a side where the bearing member is located.

In an implementation, the object carrying board is further provided with an accommodating opening that is communicated with the mounting groove, and an outer wall of the clamping and bearing member is provided with a first rotating shaft hole; the object carrying assembly further includes a mounting seat, the mounting seat includes a convex portion and a pad portion arranged up and down, the convex portion is accommodated in the accommodating opening, the convex portion is provided with a second rotating shaft hole opposite to the first rotating shaft hole, and the pad portion is mounted on the object carrying board; and the rotating shaft is inserted into the first rotating shaft hole and the second rotating shaft hole.

In an implementation, the clamping and bearing member is provided with at least one weight reduction groove.

In an implementation, the object carrying assembly further includes:

a limiting member, wherein the limiting member is arranged below the mounting groove and is close to the clamping jaw, to limit a rotation position of the clamping jaw when the clamping jaw is not loaded.

In an implementation, the object carrying assembly further includes:

a plurality of boosting posts, wherein the boosting posts are arranged close to top corners of the object carrying board, and top ends of the boosting posts are respectively connected with a bottom surface of the object carrying board; and a chassis, wherein the chassis is connected with the bottom ends of the plurality of boosting posts.

In an implementation, each of the end portions of the object carrying arm is provided with a mounting opening, and the clamping and bearing member is arranged at the mounting opening.

In an implementation, the object carrying arm is provided with an accommodating opening that is communicated with the mounting opening, and an outer wall of the clamping and bearing member is provided with a first rotating shaft hole; the object carrying assembly further includes a mounting seat, wherein the mounting seat includes a convex portion and a pad portion arranged up and down, the convex portion is accommodated in the accommodating opening, the convex portion is provided with a second rotating shaft hole opposite to the first rotating shaft hole, and the pad portion is mounted on the object carrying board; and the rotating shaft is inserted into the first rotating shaft hole and the second rotating shaft hole.

In an implementation, the object carrying assembly further includes:

a first limiting member, wherein the first limiting member is arranged below the object carrying arm and is close to the clamping jaw, to limit a rotation position of the clamping jaw when the clamping jaw is not loaded;

a second limiting member, wherein the second limiting member is arranged on a middle portion of a top surface of the object carrying arm, a top portion of the second limiting member is formed with a second inclined surface, and the second inclined surface is inclined downward from a top end of the second limiting member to an inner side of the object carrying arm.

In an implementation, an obround mounting hole is provided in a middle portion of the object carrying arm along a width direction of the object carrying arm, and the second limiting member is mounted on any position in the obround mounting hole.

In an implementation, the object carrying assembly further includes:

a rubber pad, wherein the rubber pad is arranged on a top surface of the object carrying arm, and a shape of the rubber pad is adapted to a shape of the top surface of the object carrying arm.

In an implementation, the object carrying assembly further includes:

a plurality of boosting posts, wherein the boosting posts are arranged close to the end portions of the object carrying arm, and top ends of the boosting posts are connected with a bottom surface of the object carrying arm; and a chassis, wherein the chassis is connected with bottom ends of the plurality of boosting posts.

As another aspect of the embodiments of the present disclosure, an embodiment of the present disclosure provides a transfer robot, including the object carrying assembly according to any one of the above implementations.

One of the above technical solutions has the following advantages or beneficial effects: the object carrying assembly according to the embodiments of the present disclosure can prevent the cargo from falling off due to factors such as an uneven ground surface or a fast carrying speed, and can improve the carrying efficiency.

The above summary is only for illustration, and is not intended to limit this specification in any way. In addition to the illustrative aspects, implementations, and features described above, further aspects, implementations, and features of the present disclosure will be easily understood by referring to the accompanying drawings and the following detailed description.

BRIEF DESCRIPTION OF THE DRAWINGS

To describe the technical solutions in the embodiments of the present disclosure or the related art more clearly, the following briefly describes the accompanying drawings required for describing the embodiments or the related art. Apparently, the accompanying drawings in the following description are merely some embodiments described in the embodiments of the present disclosure, and a person of ordinary skill in the art can still derive another drawing from these accompanying drawings.

DETAILED DESCRIPTION

Only some exemplary embodiments are briefly described below. As a person skilled in the art can realize, the described embodiments can be modified in different ways without departing from the spirit or scope of the present disclosure. Therefore, the drawings and description are regarded as illustrative and not restrictive in nature.

In order to solve the technical problem that the cargo is easy to fall off the object carrying platform during the process of carrying the cargo by the transfer robot, thereby reducing the carrying efficiency, the embodiments of the present disclosure provide an object carrying assembly and a transfer robot. Wherein the object carrying assembly includes an object carrying member and a clamping and bearing member. Specifically, the object carrying member includes two opposite boundary portions, and the clamping and bearing member is arranged at each of the two boundary portions of the object carrying member and is rotatably connected to the object carrying member; the clamping and bearing member is provided with a bearing member and a clamping jaw respectively on two sides of a rotating shaft; when the object carrying member is not loaded, the bearing member is at least partially higher than a bearing surface of the object carrying member, which is conducive to loading a cargo; when the object carrying member is loaded, the bearing member is not higher than the bearing surface and the clamping jaw is higher than the bearing surface, which is beneficial for the bearing member and the object carrying member to jointly bear the cargo as well as the clamping jaw to fix the cargo on the object carrying member, preventing the cargo from falling off due to an uneven carrying ground surface or a fast carrying speed, which can improve the carrying efficiency.

Next, the object carrying assembly and the transfer robot of the embodiments of the present disclosure are described in detail with reference to the accompanying drawings.

Embodiment 1

Figure 1A:
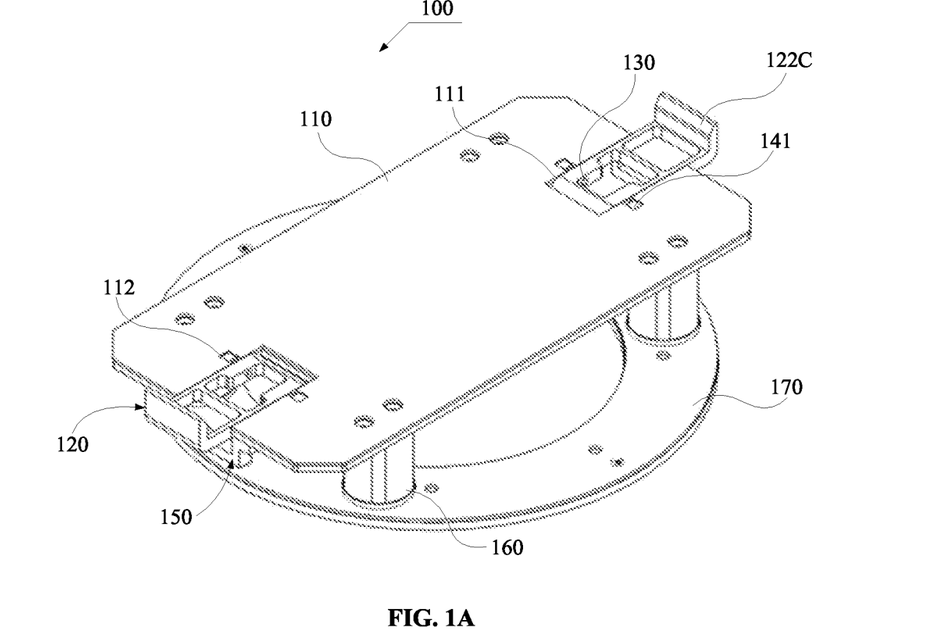
FIG. 1A shows a schematic structural diagram of an object carrying assembly according to an embodiment of the present disclosure.
Figure 1B:
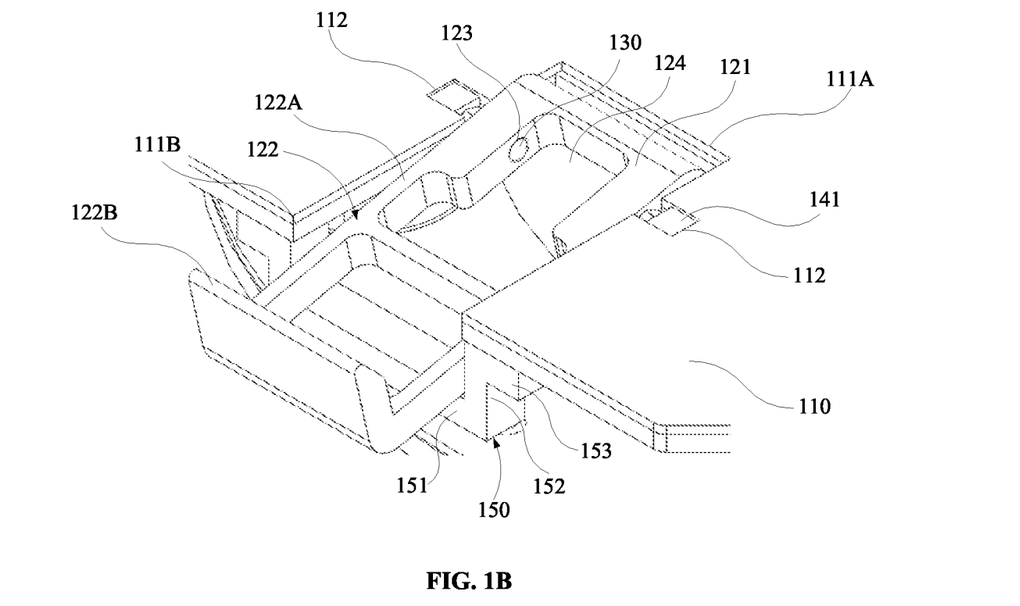
FIG. 1B shows a schematic diagram of the arrangement that a clamping and bearing member in FIG. 1A is arranged in a mounting groove.
Figure 1C:
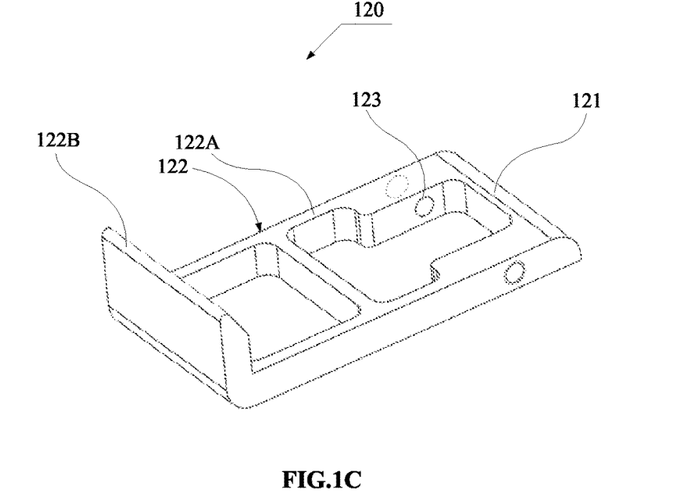
FIG. 1C shows a schematic structural diagram of the clamping and bearing member in FIG. 1A.
Figure 1D:
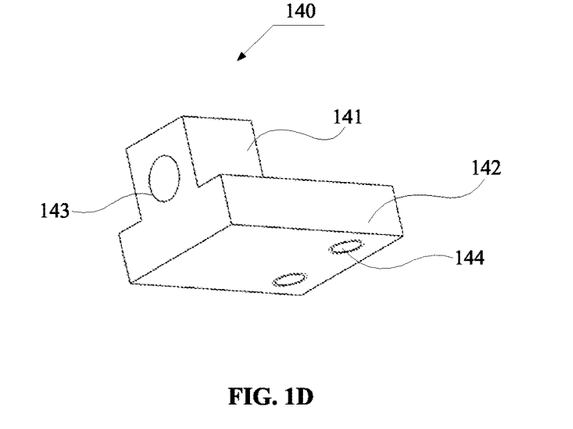
FIG. 1D shows a schematic structural diagram of the mounting seat in FIG. 1A.

FIG. 1A shows a schematic structural diagram of an object carrying assembly according to an embodiment of the present disclosure. FIG. 1B shows a schematic diagram of the arrangement that a clamping and bearing member in FIG. 1A is arranged in a mounting groove. FIG. 1C shows a schematic structural diagram of the clamping and bearing member in FIG. 1A. FIG. 1D shows a schematic structural diagram of the mounting seat in FIG. 1A. As shown in FIG. 1A to FIG. 1D, the object carrying member in the object carrying assembly 100 can be an object carrying board 110, and the two opposite boundary portions of the object carrying member are the two opposite side edges of the object carrying board 110. The object carrying assembly 100 can include: an object carrying board 110 and a plurality of clamping and bearing members 120.

Herein, the object carrying board 110 is used for placing a cargo. Specifically, the top surface of the object carrying board 110 is a bearing surface. When carrying the cargo, the cargo is placed on the bearing surface of the object carrying board 110. The type of the object carrying board 110 can be a tray, and preferably, the object carrying board 110 can be a flat tray and a column tray. In addition, the material of the object carrying board 110 can be materials such as rubber and plastic, which have the characteristics of light weight, wear resistance, water resistance, anti-skid, and elasticity, etc. The material of the object carrying board 110 can also be metal materials, wood materials, and paper materials etc. The material of the object carrying board 110 can be adjusted or selected according to actual needs, and the material of the object carrying board 110 is not limited in the embodiments of the present disclosure.

Each of the two opposite side edges of the object carrying board 110 is provided with at least one mounting groove 111. The object carrying board 110 can be rectangular, the mounting grooves 111 can be arranged on the edges of two short sides of the object carrying board 110, and the mounting grooves 111 can also be arranged on the edges of two long sides of the object carrying board 110; the object carrying board 110 can also have a shape such as circle, parallelogram, and ellipse with opposite side edges. One or more mounting grooves 111 can be provided on each side edge of the object carrying board 110, and the mounting grooves 111 provided on the two opposite side edges of the object carrying board 110 can be arranged oppositely. For example, in FIG. 1A, a mounting groove 111 is provided on each of the two opposite side edges of the object carrying board 110, and the mounting grooves 111 on the two opposite side edges are arranged oppositely, which is beneficial to the opposite arrangement of the clamping and bearing members 120, in order for the clamping and bearing members 120 to clamp and bear the cargo on the opposite positions of the cargo. The shape of the object carrying board 110, the number of the mounting grooves 111, and the arrangement positions of the mounting grooves 111 can be adjusted and selected according to actual needs, which is not limited in the embodiments of the present disclosure.

The clamping and bearing member 120 is arranged in the mounting groove 111 and is rotatably connected to a groove wall of the mounting groove 111; and the clamping and bearing member 120 is provided with a bearing member 121 and a clamping jaw 122 respectively on two sides of a rotating shaft 130. That is to say, when the bearing member 121 sinks, the clamping jaw 122 rises; and when the clamping jaw 122 sinks, the bearing member 121 rises.

Herein, the bearing member 121 can be arranged close to the groove bottom side 111A of the mounting groove 111, and the clamping jaw 122 can be arranged close to the notch side 111B of the mounting groove 111. In this way, when the object carrying board 110 is loaded, the clamping jaw 122 clamps the side wall 152 of the cargo; or, when the bottom portion of the cargo has a bayonet, the clamping jaw 122 can hook the bayonet on the bottom portion of the cargo to fix the cargo on the bearing surface of the object carrying board 110, thereby preventing the cargo from falling off. Further, the clamping jaw 122 can be located inside the notch side 111B of the mounting groove 111, which is beneficial for clamping and bearing a smaller-sized cargo; and the clamping jaws 122 can also extend out of the notch side 111B of the mounting groove 111, which is beneficial for clamping and bearing a larger-sized cargo.

In addition, the bearing member 121 can also be arranged close to the notch side 111B of the mounting groove 111, and the clamping jaw 122 can also be arranged close to the groove bottom side 111A of the mounting groove 111. In this way, when the object carrying board 110 is loaded with a cargo, the clamping jaw 122 can hook the bayonet on the bottom portion of the cargo, and fix the cargo on the bearing surface of the object carrying board 110, thereby preventing the cargo from falling off. Further, the end portion of the bearing member 121 away from the clamping jaw 122 can be located inside the notch side 111B of the mounting groove 111, which is beneficial for carrying a small-sized cargo; the end portion of the bearing member 121 away from the clamping jaw 122 can extend out of the notch side 111B of the mounting groove 111, which is beneficial for clamping and bearing a larger-sized cargo.

Herein, when the object carrying board 110 is not loaded, the bearing member 121 is at least partially higher than the bearing surface of the object carrying board 110; and when the object carrying board 110 is loaded, the bearing member 121 is not higher than the bearing surface and the clamping jaw 122 is higher than the bearing surface. Specifically, when the object carrying board 110 is not loaded, the clamping and bearing member 120 takes the rotating shaft 130 as a fulcrum to generate inclination through the lever principle: the clamping jaw 122 sinks so as to be at least partially lower than the bearing surface of the object carrying board 110, and the sinking of the clamping jaw 122 will drive the bearing member 121 to rise, so that the bearing member 121 is at least partially higher than the bearing surface of the object carrying board 110.

Exemplarily, when the object carrying board 110 is not loaded, if the bearing member 121 is arranged close to the groove bottom side 111A of the mounting groove 111 and the clamping jaw 122 is arranged close to the notch side 111B of the mounting groove 111, the end portion of the bearing member 121 away from the rotating shaft 130 rises and the end portion of the clamping jaw 122 away from the rotating shaft 130 sinks, so that the clamping and bearing member 120 is inclined outward; and if the bearing member 121 is arranged close to the notch side 111B of the mounting groove 111 and the clamping jaw 122 is arranged close to the groove bottom side 111A of the mounting groove 111, the clamping and bearing member 120 is inclined inward.

When the object carrying board 110 is loaded with a cargo, the end portion of the bearing member 121 away from the rotating shaft 130 is rotated towards the direction close to the bearing surface of the object carrying board 110 under the action of the gravity of the cargo, and is gradually coplanar with the bearing surface of the object carrying board 110 or lower than the bearing surface of the object carrying board 110, to jointly bear the cargo with the object carrying board 110. The bearing member 121 also drives the clamping jaw 122 to rotate toward the direction close to the bearing surface of the object carrying board 110, so that the clamping jaw 122 is higher than the bearing surface of the object carrying board 110, to fix the side wall 152 of the cargo or the bottom portion of the cargo, thereby realizing automatic clamping and bearing and protection of the cargo and preventing the cargo from falling off due to an uneven road surface or a fast carrying speed, so that the cargo carrying efficiency can be improved.

In an implementation, the distance between the rotating shaft 130 and the end portion of the bearing member 121 is smaller than the distance between the rotating shaft 130 and the end portion of the clamping jaw 122. Specifically, when the mass of the clamping and bearing member 120 is evenly distributed, the distance between the rotating shaft 130 and the end portion of the bearing member 121 is set to be smaller than the distance between the rotating shaft 130 and the end portion of the clamping jaw 122, so that when the object carrying board 110 is not loaded, the clamping and bearing member 120 can be naturally inclined downward toward the side where the clamping jaw 122 is located by means of its own gravity with the rotating shaft 130 as a fulcrum, thus the clamping jaw 122 naturally sinks and the bearing member 121 naturally rises, which is beneficial for loading a cargo on the object carrying board 110.

In an implementation, the center of gravity of the clamping and bearing member 120 is set away from the rotating shaft 130, so that when the object carrying board 110 is not loaded, the clamping and bearing member 120 can be naturally inclined downward by means of its own gravity with the rotating shaft 130 as a fulcrum, thus the clamping jaw 122 naturally sinks and the bearing member 121 naturally rises, which is beneficial for loading a cargo on the object carrying board 110.

In an implementation, the center of gravity of the clamping and bearing members 120 is set at the end portion of the clamping and bearing member 120 away from the rotating shaft 130. Specifically, the center of gravity of the clamping and bearing member 120 can be set at the end portion of the clamping jaw 122, so that when the object carrying board 110 is not loaded, the clamping and bearing member 120 can be naturally inclined toward the side where the clamping jaw 122 is located by means of its own weight with the rotating shaft 130 as a fulcrum, thus the clamping jaw 122 naturally sinks and the bearing member 121 naturally rises, which is beneficial for loading a cargo on the object carrying board 110.

In an implementation, the clamping jaw 122 includes a bearing portion 122A and a clamping portion 122B. The bearing portion 122A is coplanar with the bearing member 121, and the clamping portion 122B protrudes out of a surface of the bearing portion 122A from the end portion of the bearing portion 122A away from the rotating shaft 130. Specifically, the clamping portion 122B protrudes toward the bearing surface of the object carrying board 110. When the object carrying board 110 is loaded with a cargo, the bearing portion 122A can bear the cargo together with the bearing member 121 and the object carrying board 110, and the clamping portion 122B protrudes out of the bearing surface of the object carrying board 110, so that the side wall 152 of the cargo or the bottom portion of the cargo can be fixed on the object carrying board 110, thereby preventing the cargo from falling off.

In an implementation, the top portion of the clamping portion 122B is formed with a first inclined surface 122C, and the first inclined surface 122C is inclined downward from the top end of the clamping portion 122B to the side where the bearing member 121 is located, which is beneficial for the cargo to slide to the top surface of the object carrying board 110 along the first inclined surface 122C, thereby preventing the cargo from being misplaced or stuck.

In an implementation, the object carrying board 110 is further provided with an accommodating opening 112 that is communicated with the mounting groove 111, and an outer wall of the clamping and bearing member 120 is provided with a first rotating shaft hole 123. The object carrying assembly 100 further includes a mounting seat 140, the mounting seat 140 includes a convex portion 141 and a pad portion 142 arranged up and down, the convex portion 141 is accommodated in the accommodating opening 112, the convex portion 141 is provided with a second rotating shaft hole 143 opposite to the first rotating shaft hole 123, and the pad portion 142 is mounted on the object carrying board 110; and the rotating shaft 130 is inserted into the first rotating shaft hole 123 and the second rotating shaft hole 143. In this way, the clamping and bearing member 120 can be rotated with the rotating shaft 130 as a fulcrum, so as to load and unload the cargo.

Herein, two sides of the pad portion 142 are provided with mounting holes 144, so that the pad portion 142 can be mounted under the object carrying board 110.

In an implementation, the clamping and bearing member 120 is provided with at least one weight reduction groove 124. Specifically, a weight reduction groove 124 can be provided on the clamping and bearing member 120 near the groove bottom side 111A of the mounting groove 111 and the notch side 111B of the mounting groove 111 respectively, to reduce the weight of the object carrying assembly 100. Herein, the thickness of the groove wall of the weight reduction groove 124 near the rotating shaft 130 can be greater than thicknesses at other positions, which can increase the wear resistance of the groove wall of the weight reduction groove 124 and prolong the service life of the clamping and bearing member 120.

In an implementation, the object carrying assembly 100 can further include a limiting member, and the limiting member is arranged below the mounting groove 111 and is close to the clamping jaw 122, to limit a rotation position of the clamping jaw 122 when the clamping jaw 122 is not loaded.

Specifically, the limiting member can be a limiting groove 150. A bottom wall 151 of the limiting groove 150 is parallel to the object carrying board 110, a side wall 152 of the limiting groove 150 is perpendicular to the object carrying board 110, and the top portion of the side wall 152 of the limiting groove 150 extends outward to form a connecting portion 153, and the connecting portion 153 is used for connecting with the bottom surface of the object carrying board 110, to mount the limiting groove 150 on the object carrying board 110.

When the object carrying board 110 is not loaded, the bottom portion of the clamping and bearing member 120 abuts against the bottom wall 151 of the limiting groove 150, which can limit the rotation position of the clamping jaw 122 and prevent the clamping jaw 122 from rotating excessively and hindering the loading and unloading of the cargo.

In an implementation, the object carrying assembly 100 can further include a plurality of boosting posts 160, the boosting posts 160 are arranged close to top corners of the object carrying board 110, and the top ends of the boosting posts are respectively connected with the bottom surface of the object carrying board 110. For example, when the object carrying board 110 is rectangular, the boosting posts 160 are arranged close to the four top corners of the object carrying board 110 and are connected with the bottom surface of the object carrying board 110. As such, the plurality of boosting posts 160 can boost the object carrying board 110.

In an implementation, the object carrying assembly 100 can further include a chassis 170, the chassis 170 is connected with the bottom ends of the plurality of boosting posts 160, so as to support the boosting posts 160 and make the object carrying board 110 more stable, and also it is advantageous to mount the chassis 170 on the transfer robot.

Figure 2A:
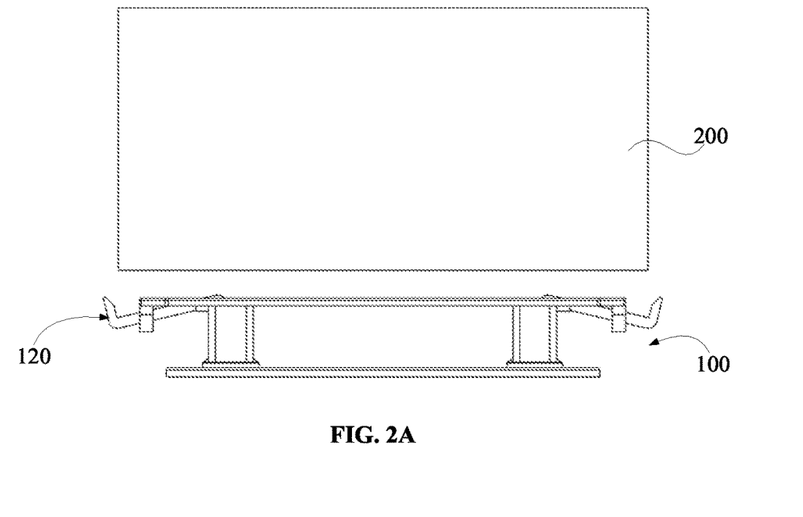
FIG. 2A shows a schematic diagram of the action of the object carrying assembly before the cargo is loaded.
Figure 2B:
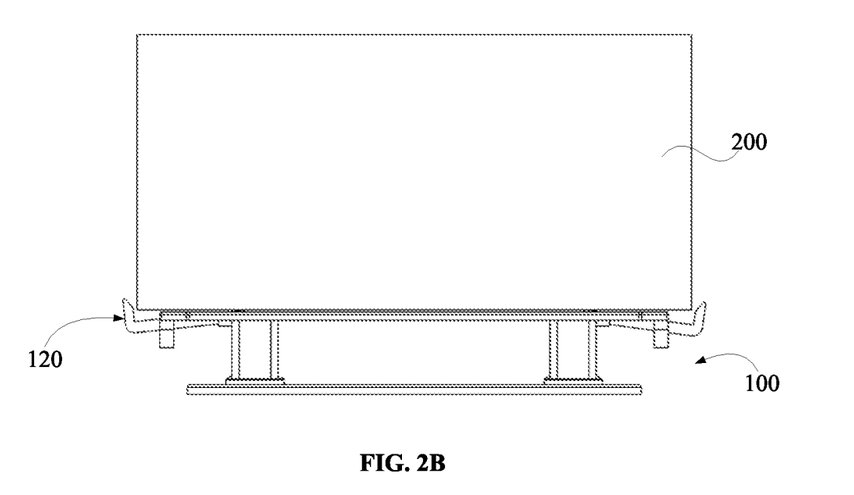
FIG. 2B shows a schematic diagram of the action of the object carrying assembly during cargo loading.
Figure 2C:
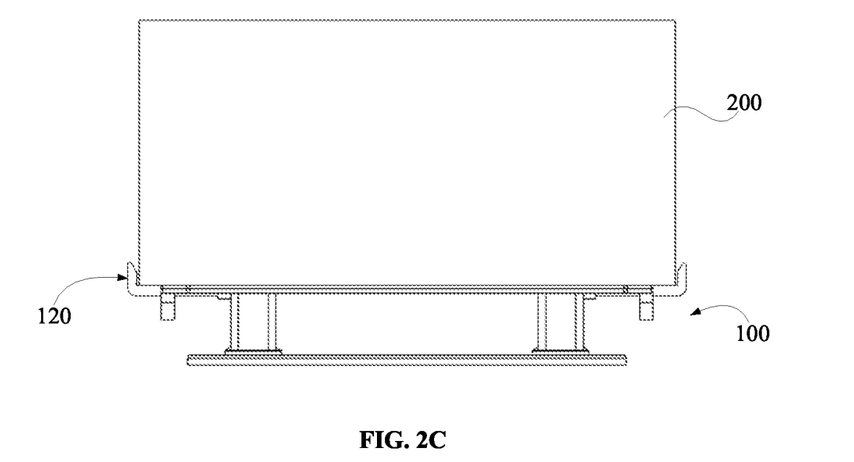
FIG. 2C shows a schematic diagram of the action of the object carrying assembly when the loading of the cargo is finished.

Next, please refer to FIG. 2A to FIG. 2C together. Taking the bearing member of the clamping and bearing member 120 being arranged close to the groove bottom side 111A of the mounting groove 111 and the clamping jaw 122 being arranged close to the notch side 111B of the mounting groove 111 as an example, the loading process of loading a cargo by using the object carrying assembly of the embodiments of the present disclosure will be described.

As shown in FIG. 1A to FIG. 2C, before the cargo 200 is loaded, since the center of gravity of the clamping and bearing member 120 in the object carrying assembly 100 is set to a position away from the rotating shaft 130, the clamping and bearing member 120 is inclined outward under the action of its own gravity with the rotation shaft 130 as a fulcrum, so that the clamping and bearing member 120 is in a released state, to facilitate loading the cargo 200 on the object carrying board 110.

When the cargo 200 is placed on the object carrying board 110, the cargo 200 presses the end portion of the bearing member 121 of the clamping and bearing member 120 away from the rotating shaft 130, so that the bearing member 121 rotates toward the direction close to the object carrying board 110 and is gradually coplanar with the bearing surface of the object carrying board 110. At this time, the bearing member 121 drives the clamping jaw 122 to rotate toward the direction close to the object carrying board 110, so that the bearing portion 122A of the clamping jaw 122 is also coplanar with the bearing surface of the object carrying board 110, thus the object carrying board 110, the bearing member 121, and the bearing portion 122A of the clamping jaw 122 jointly bear the cargo 200, and the clamping portion 122B of the clamping jaw 122 protrudes out of the bearing surface of the object carrying board 110, to clamp the side wall of the cargo 200.

When the loading of the cargo 200 is completed, the object carrying board 110, the bearing member 121, and the bearing portion 122A of the clamping jaw 122 in the object carrying assembly 100 are kept in a coplanar state, to jointly bear the cargo 200, and the clamping portion 122B of the clamping jaw 122 protrudes out of the bearing surface of the object carrying board 110, to keep the side wall of the cargo 200 clamped. In this way, the automatic loading of the cargo can be realized without using a pneumatic device or a hydraulic device to clamp and fix the cargo, which can reduce the loading cost and improve the loading efficiency.

It can be understood that the unloading process of the cargo 200 is opposite to the loading process of the cargo 200, and details are not described herein again. It should be noted that, when the cargo 200 is unloaded, since the clamping and bearing member 120 is inclined outward by means of its own gravity with the rotating shaft 130 as a fulcrum when the cargo 200 leaves the object carrying board 110, there is no need to perform an unloading operation on the clamping and bearing member 120, and the clamping and bearing member 120 will not hinder the unloading of the cargo 200, which can improve the unloading efficiency.

The embodiment of the present disclosure further provides a transfer robot, including the object carrying assembly 100 of any one of the foregoing implementations.

According to the object carrying assembly 100 and the transfer robot according to the embodiments of the present disclosure, at least one mounting groove 111 is respectively provided on two opposite side edges of the object carrying board 110, and the clamping and bearing member 120 is provided in the mounting groove 111, wherein the clamping and bearing member 120 is rotatably connected to a groove wall of the mounting groove 111.

When the object carrying board 110 is not loaded, the bearing member 121 of the clamping and bearing member 120 is at least partially higher than the bearing surface of the object carrying board 110 and the clamping jaw 122 is at least partially lower than the bearing surface of the object carrying board 110, which is conducive to loading a cargo. When the object carrying board 110 is loaded, the bearing member 121 is not higher than the bearing surface and the clamping jaw 122 is higher than the bearing surface, which is beneficial for the bearing member 121 and the object carrying board 110 to jointly bear the cargo and the clamping jaw 122 to fix the cargo on the object carrying board 110, thereby preventing the cargo from falling off due to an uneven ground surface or a fast carrying speed, which can improve the carrying efficiency. In addition, when the cargo is unloaded, the clamping jaw 122 naturally sinks by means of its own gravity, without performing an unloading operation on the clamping member, thus the unloading efficiency of the cargo is high.

Embodiment 2

Figure 3A:
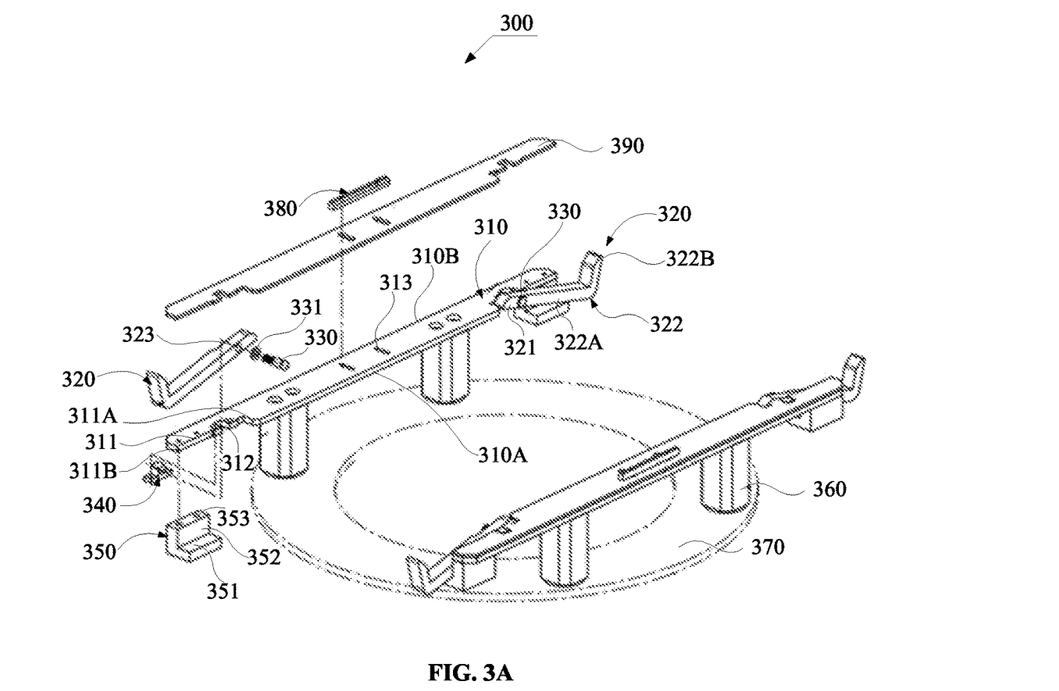
FIG. 3A shows a schematic exploded perspective view of an object carrying assembly of another embodiment of the present disclosure.
Figure 3B:
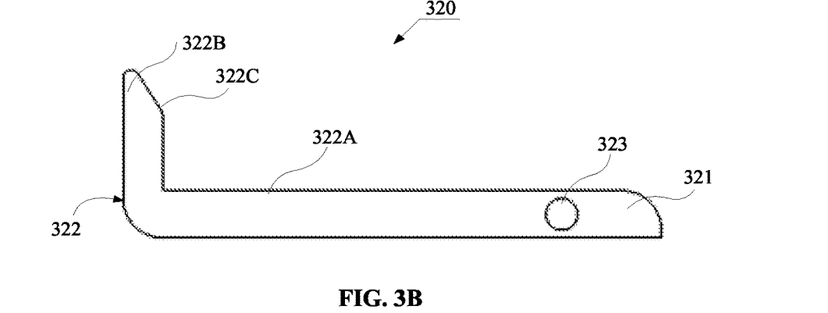
FIG. 3B shows a schematic structural diagram of the clamping and bearing member in FIG. 3A.
Figure 3C:
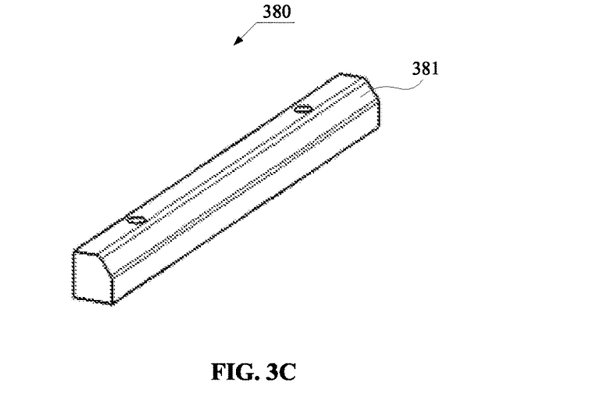
FIG. 3C shows a schematic structural diagram of the second limiting member in FIG. 3A.
Figure 3D:
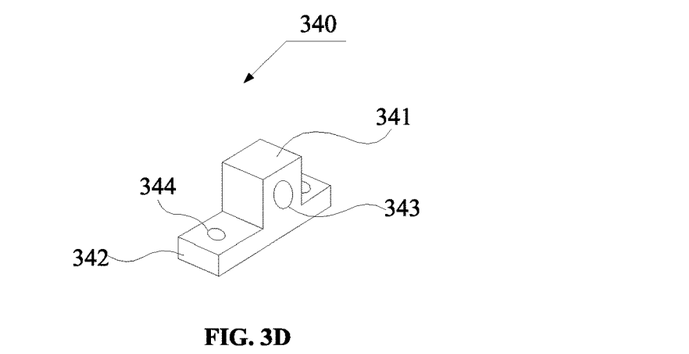
FIG. 3D shows a schematic structural diagram of the mounting seat in FIG. 3A.

FIG. 3A shows a schematic exploded perspective view of an object carrying assembly of an embodiment of the present disclosure. FIG. 3B shows a schematic structural diagram of the clamping and bearing member in FIG. 3A. FIG. 3C shows a schematic structural diagram of the second limiting member in FIG. 3A. FIG. 3D shows a schematic structural diagram of the mounting seat in FIG. 3A. The structure of the object carrying assembly 300 will be described below with reference to FIGS. 3A to 3D.

As shown in FIG. 3A to FIG. 3D, the object carrying member in the object carrying assembly 300 can be an object carrying arm 310, and the two opposite boundary portions of the object carrying member can be two end portions of the object carrying arm 310. The object carrying assembly 300 can include: at least one object carrying arm 310 and two clamping and bearing members 320.

Herein, the object carrying arm 310 is used for carrying the cargo, and the top surface of the object carrying arm 310 is a bearing surface. The number of the object carrying arms 310 can be one, two, or more, and the number of the object carrying arms 310 can be adjusted and selected according to actual needs. The embodiments of the present disclosure do not limit the number of the object carrying arms 310.

Exemplarily, when there is one object carrying arm 310, the object carrying arm 310 can bear the middle portion of the cargo.

When there are two object carrying arms 310, the two object carrying arms 310 are spaced apart, and the two object carrying arms 310 can respectively bear two ends of the cargo, so that the cargo can be stably placed on the object carrying arms 310.

When there are multiple object carrying arms 310, the multiple object carrying arms 310 are arranged at an interval, and the multiple object carrying arms 310 bear the cargo in multiple places along the length direction or the width direction of the cargo, so that the stability of the object carrying arms 310 when carrying the cargo can be further improved.

In addition, in this implementation, since fewer materials are required for the manufacture of the object carrying arm 310, the manufacturing cost of the object carrying assembly 300 can be reduced.

The two clamping and bearing members 320 are respectively arranged at the end portions of the object carrying arm 310 and are rotatably connected to the wall body of the object carrying arm 310. The clamping and bearing member 320 is provided with a bearing member 321 and a clamping jaw 322 respectively on two sides of a rotating shaft 330. That is, when the bearing member 321 sinks, the clamping jaw 322 rises; when the clamping jaw 322 sinks, the bearing member 321 rises. Herein, the clamping and bearing member 320 is an integral member.

In an example, the wall body of the object carrying arm 310 includes an inner side wall 310A and an outer side wall 310B, and the clamping and bearing member 320 can be rotatably connected to the inner side wall 310A or the outer side wall 310B of the object carrying arm 310, which is not limited in the embodiments of the present disclosure, as long as the clamping and bearing member 320 can clamp and bear the cargo placed on the object carrying arm 310.

Herein, when the object carrying arm 310 is not loaded, the bearing member 321 is at least partially higher than the bearing surface of the object carrying arm 310; when the object carrying arm 310 is loaded, the bearing member 321 is not higher than the bearing surface and the clamping jaw 322 is higher than the bearing surface.

Specifically, when the object carrying arm 310 is not loaded, the clamping and bearing member 320 takes the rotating shaft 330 as a fulcrum to generate inclination through the lever principle: the clamping jaw 322 sinks so as to be at least partially lower than the bearing surface of the object carrying arm 310, and the sinking of the clamping jaw 322 will drive the bearing member 321 to rise, so that the bearing member 321 is at least partially higher than the bearing surface of the object carrying arm 310.

When the object carrying arm 310 is loaded with a cargo, the end portion of the bearing member 321 away from the rotating shaft 330 is rotated towards the direction close to the bearing surface of the object carrying arm 310 under the action of the gravity of the cargo, and is gradually coplanar with the bearing surface of the object carrying arm 310 or lower than the bearing surface of the object carrying arm 310, to jointly bear the cargo with the object carrying arm 310. The bearing member 321 also drives the clamping jaw 322 to rotate toward the direction close to the bearing surface of the object carrying arm 310, so that the clamping jaw 322 is higher than the bearing surface of the object carrying arm 310, to fix the side wall or bottom portion of the cargo, thereby realizing automatic clamping and protection of the cargo and preventing the cargo from falling off due to an uneven road surface or a fast carrying speed, so that the cargo carrying efficiency can be improved.

In an implementation, the distance between the rotating shaft 330 and the end portion of the bearing member 321 is smaller than the distance between the rotating shaft 330 and the end portion of the clamping jaw 322. Specifically, when the mass of the clamping and bearing member 320 is evenly distributed, the distance between the rotating shaft 330 and the end portion of the bearing member 321 is set to be smaller than the distance between the rotating shaft 330 and the end portion of the clamping jaw 322, so that when the object carrying arm 310 is not loaded, the clamping and bearing member 320 can be naturally inclined downward toward the side where the clamping jaw 322 is located by means of its own gravity with the rotating shaft 330 as a fulcrum, thus the clamping jaw 322 naturally sinks and the bearing member 321 naturally rises, which is beneficial for loading a cargo on the object carrying arm 310.

In an implementation, the center of gravity of the clamping and bearing member 320 is set away from the rotating shaft 330, so that when the object carrying arm 310 is not loaded, the clamping and bearing member 320 can be naturally inclined downward by means of its own gravity with the rotating shaft 330 as a fulcrum, thus the clamping jaw 322 naturally sinks and the bearing member 321 naturally rises, which is beneficial for loading a cargo on the object carrying arm 310.

In an implementation, the center of gravity of the clamping and bearing member 320 is set at the end portion of the clamping and bearing member 320 away from the rotating shaft 330. Specifically, the center of gravity of the clamping and bearing member 320 can be set at the end portion of the clamping jaw 322, so that when the object carrying arm 310 is not loaded, the clamping and bearing member 320 can be naturally inclined toward the side where the clamping jaw 322 is located by means of its own weight with the rotating shaft 330 as a fulcrum, thus the clamping jaw 322 naturally sinks and the bearing member 321 naturally rises, which is beneficial for loading a cargo on the object carrying arm 310.

In an implementation, the clamping jaw 322 includes a bearing portion 322A and a clamping portion 322B. The bearing portion 322A is coplanar with the bearing member 321, and the clamping portion 322B protrudes out of a surface of the bearing portion 322A from the end portion of the bearing portion 322A away from the rotating shaft 330. Herein, when the object carrying arm 310 is loaded with a cargo, the bearing portion 322A can bear the cargo together with the bearing member 321 and the object carrying arm 310, and the clamping portion 322B protrudes out of the bearing surface of the object carrying arm 310, so that the side wall 352 or the bottom portion of the cargo can be fixed on the object carrying arm 310, thereby preventing the cargo from falling off.

In an implementation, an end portion of the object carrying arm 310 is provided with a mounting opening 311, and an clamping and bearing member 320 is arranged at the mounting opening 311 and is rotatably connected to the wall body of the mounting opening 311.

Herein, the bearing member 321 can be arranged close to the inner side 311A of the mounting opening 311, and the clamping jaw 322 can be arranged close to the outer side 311B of the mounting opening 311. In this way, when the object carrying arm 310 is loaded, the clamping jaw 322 clamps the side walls of the cargo; or, when the bottom portion of the cargo has a bayonet, the clamping jaw 322 can hook the bayonet at the bottom portion of the cargo to fix the cargo on the bearing surface of the object carrying arm 310, thereby preventing the cargo from falling off. Further, the clamping jaw 322 can extend out of the outer side 311B of the mounting opening 311, which is beneficial for clamping and bearing a larger-sized cargo.

In addition, the bearing member 321 can also be arranged close to the outer side 311B of the mounting opening 311, and the clamping jaw 322 can also be arranged close to the inner side 311A of the mounting opening 311. In this way, when the object carrying arm 310 is loaded with a cargo, the clamping jaw 322 can hook the bayonet on the bottom portion of the cargo, and fix the cargo on the bearing surface of the object carrying arm 310, thereby preventing the cargo from falling off. Further, the end portion of the bearing member 321 away from the clamping jaw 322 can be located in the middle portion of the mounting opening 311, which is beneficial for bearing a small-sized cargo; the end portion of the bearing member 321 away from the clamping jaw 322 can extend out of the outer side 311B of the mounting opening 311, which is beneficial for bearing a larger-sized cargo.

Exemplarily, when the object carrying arm 310 is not loaded, if the bearing member 321 is arranged close to the inner side 311A of the mounting opening 311 and the clamping jaw 322 is arranged close to the outer side 311B of the mounting opening 311, the end portion of the bearing member 321 away from the rotating shaft 330 rises and the end portion of the clamping jaw 322 away from the rotating shaft 330 sinks, so that the clamping and bearing member 320 is inclined outward; and if the bearing member 321 is arranged close to the outer side 311B of the mounting opening 311 and the clamping jaw 322 is arranged close to the inner side 311A of the mounting opening 311, the clamping and bearing member 320 is inclined inward.

In an implementation, the top portion of the clamping portion 322B is formed with a first inclined surface 322C, and the first inclined surface 322C is inclined downward from the top end of the clamping portion 322B to the bearing member 321, which is beneficial for the cargo to slide to the top surface of the object carrying arm 310 along the first inclined surface 322C, thereby preventing the cargo from being misplaced or stuck.

In an implementation, the object carrying arm 310 is provided with an accommodating opening 312 that is communicated with the mounting opening 311, and an outer side wall 310B of the clamping and bearing member 320 is provided with a first rotating shaft hole 323; the object carrying assembly 300 further includes a mounting seat 340, the mounting seat 340 includes a convex portion 341 and a pad portion 342 arranged up and down, the convex portion 341 is accommodated in the accommodating opening 312, the convex portion 341 is provided with a second rotating shaft hole 343 opposite to the first rotating shaft hole 323, and the pad portion 342 is mounted on the object carrying arm 310; and the rotating shaft 330 is inserted into the first rotating shaft hole 323 and the second rotating shaft hole 343, and a gasket 331 is also sleeved on the rotating shaft 330. In this way, the clamping and bearing member 320 is rotated with the rotating shaft 330 as a fulcrum, so as to load and unload the cargo.

Herein, two sides of the pad portion 342 are provided with first mounting holes 344, so that the pad portion 342 can be mounted under the object carrying arm 310.

In an implementation, the object carrying assembly 300 can further include a first limiting member 350. The first limiting member 350 is arranged below the object carrying arm 310 and is close to the clamping jaw 322, to limit a rotation position of the clamping jaw 322 when the clamping jaw 322 is not loaded.

Specifically, the first limiting member 350 includes a bottom wall 351 and a side wall 352, the cross section of the first limiting member 350 is L-shaped, the bottom wall 351 of the first limiting member 350 is parallel to the object carrying arm 310, the side wall 352 of the first limiting member 350 is perpendicular to the object carrying arm 310, and the top portion of the side wall 352 of the first limiting member 350 is provided with a second mounting hole 353 for mounting the first limiting member 350 on the object carrying arm 310.

When the object carrying arm 310 is not loaded, the bottom portion of the clamping and bearing member 320 abuts against the bottom wall 351 of the first limiting member 350, which can limit the rotation position of the clamping jaw 322 and prevent the clamping jaw 322 from rotating excessively and hindering the loading and unloading of cargo.

In an implementation, the object carrying assembly 300 can further include a second limiting member 380, and the second limiting member 380 is arranged in the middle portion of the top surface of the object carrying arm 310.

In an example, when the cargo is carried, the second limiting member 380 can be inserted into the bayonet on the bottom portion of the cargo, which can prevent the cargo from shaking on the object carrying arm 310.

In an example, when there are two object carrying arms 310, the second limiting members 380 on the two object carrying arms 310 can limit the opposite sides of the cargo, and can also prevent the cargo from shaking on the object carrying arms 310.

In an example, the top portion of the second limiting member 380 is formed with a second inclined surface 381, and the second inclined surface 381 is inclined downward from the top end of the second limiting member 380 to the inner side 310A of the object carrying arm 310, so that the cargo can slide to the top surface of the object carrying arm 310 along the second inclined surface 381. Exemplarily, when there are two object carrying arms 310, an accommodating area for accommodating a cargo can be enclosed between the second limiting members 380 of the two object carrying arms 310; if the cargo is placed in the accommodating area, the cargo can slide into the accommodating area along the second inclined surfaces 381 of the two second limiting members 380, so that the cargo can be prevented from being misplaced or stuck.

In an implementation, an obround mounting hole 313 is provided in the middle portion of the object carrying arm 310 along the width direction of the object carrying arm 310, and the second limiting member 380 is mounted on any position in the obround mounting hole 313. In this way, the position of the second limiting member 380 on the object carrying arm 310 can be adjusted by adjusting the position where the second limiting member 380 is mounted in the obround mounting hole 313.

In an example, when there are two object carrying arms 310, the distance between the two second limiting members 380 can be adjusted by adjusting the positions where the two second limiting members 380 are mounted in the obround mounting holes 313, so that this can adapt to the carrying needs of different sizes of cargoes.

In an implementation, the object carrying assembly 300 can further include a rubber pad 390, the rubber pad 390 is arranged on the top surface of the object carrying arm 310, and the shape of the rubber pad 390 is adapted to the shape of the top surface of the object carrying arm 310.

In an example, the rubber pad 390 can be located between the top surface of the object carrying arm 310 and the bottom surface of the first limiting member 350.

In this implementation, by providing the rubber pad 390, the friction force of the bearing surface of the object carrying arm 310 can be increased to prevent the cargo from sliding. In addition, the rubber pad 390 is softer, which can also avoid the wear of the cargo and reduce the noise.

In an implementation, the object carrying assembly 300 can further include a plurality of boosting posts 360. The boosting post 360 are arranged close to the end portions of the object carrying arm 310, and the top ends of the boosting posts 360 are connected with the bottom surface of the object carrying arm 310. In this way, the plurality of boosting posts 360 can boost the object carrying arm 310.

In an implementation, the object carrying assembly 300 can further include a chassis 370. The chassis 370 is connected with the bottom ends of the plurality of boosting posts 360, to support the boosting posts 360 and make the object carrying arm 310 more stable, and also be beneficial for mounting the chassis 370 on the transfer robot.

Next, please refer to FIG. 4A to FIG. 4D together. Taking that there being two object carrying arms 310 of the object carrying assembly 300, the bearing member 321 of the clamping and bearing member 320 being arranged close to the inner side 311A of the mounting opening 311, and the clamping jaw 322 being arranged close to the outer side 311B of the mounting opening 311 as an example, the loading process of loading a cargo by using the object carrying assembly 300 of the embodiments of the present disclosure will be described.

Figure 4A:
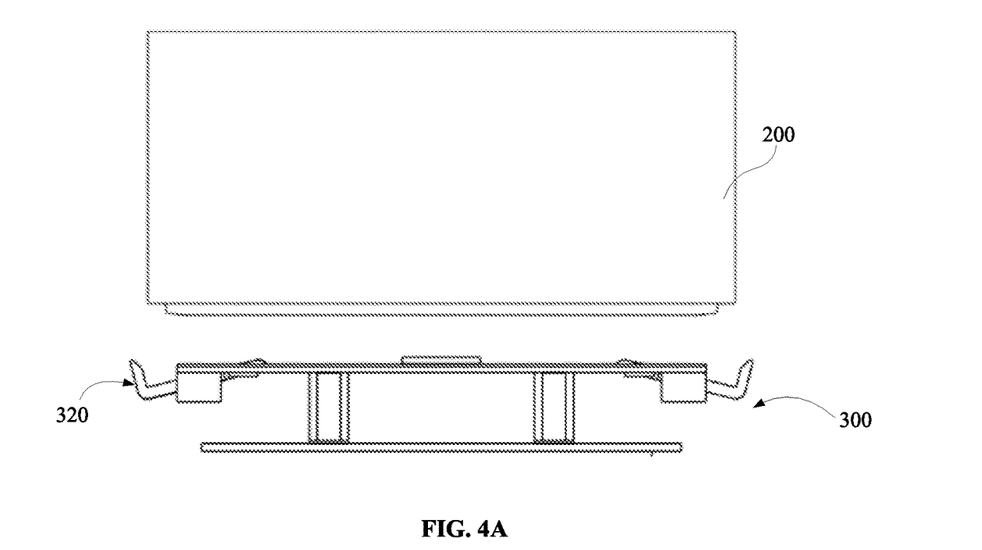
FIG. 4A shows a schematic diagram of the action of the clamping and bearing member before the cargo is loaded.
Figure 4B:
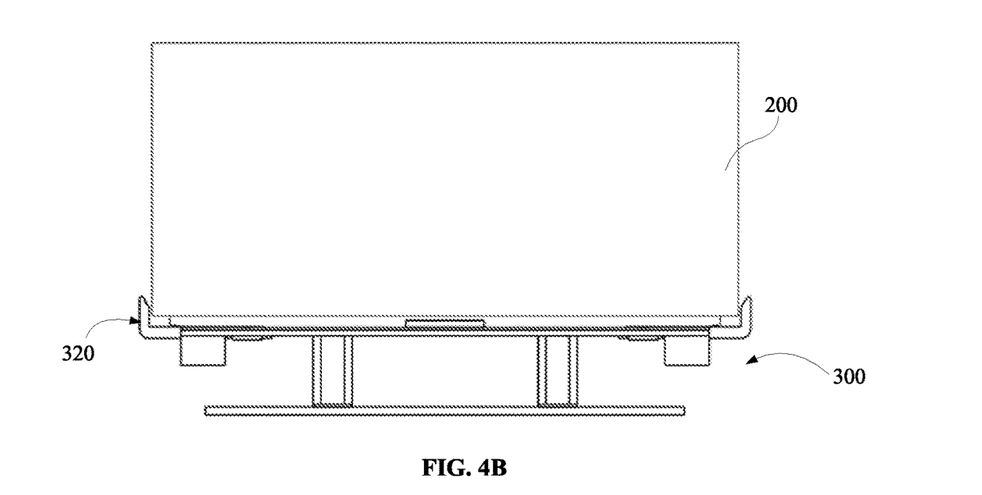
FIG. 4B shows a schematic diagram of the action of the clamping and bearing member after the cargo is loaded.
Figure 4C:
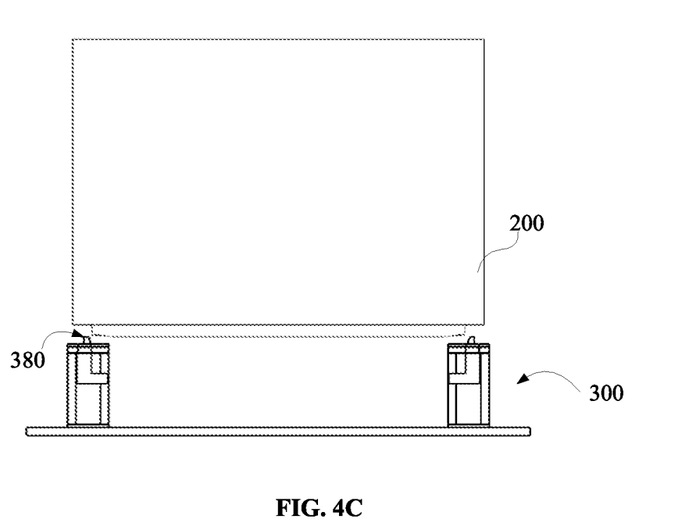
FIG. 4C shows a schematic diagram of the position between the cargo and the second limiting member before the cargo is loaded.

Before the cargo 200 is loaded, since the center of gravity of the clamping and bearing member in the object carrying assembly 300 is set at a position away from the rotating shaft 330, the clamping and bearing member is inclined outward under the action of its own gravity with the rotating shaft 330 as a fulcrum, so that the clamping and bearing member is in a released state, to facilitate loading of the cargo 200 on the object carrying arm 310.

When the cargo 200 is placed on the object carrying arm 310, the cargo 200 presses the end portion of the bearing member 321 of the clamping and bearing member away from the rotating shaft 330, so that the bearing member 321 rotates toward the direction close to the object carrying arm 310 and is gradually coplanar with the bearing surface of the object carrying arm 310. At this time, the bearing member 321 drives the clamping jaw 322 to rotate toward the direction close to the object carrying arm 310, so that the bearing portion 322A of the clamping jaw 322 is also coplanar with the bearing surface of the object carrying arm 310, thus the object carrying arm 310, the bearing member 321, and the bearing portion 322A of the clamping jaw 322 jointly bear the cargo 200, and the clamping portion 322B of the clamping jaw 322 protrudes out of the bearing surface of the object carrying arm 310, to clamp the side wall 352 of the cargo 200.

Figure 4D:
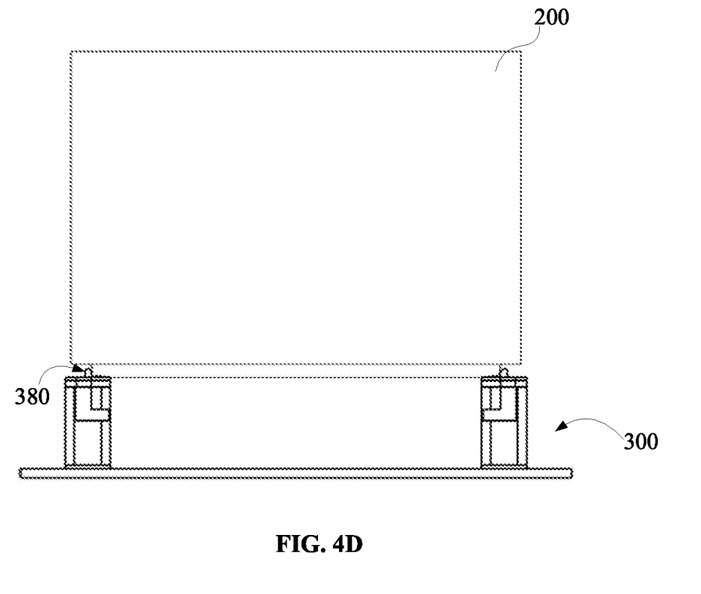
FIG. 4D shows a schematic diagram of the position between the cargo and the second limiting member after the cargo is loaded.

When the loading of the cargo 200 is completed, the object carrying arm 310, the bearing member 321, and the bearing portion 322A of the clamping jaw 322 in the object carrying assembly 300 are kept in a coplanar state, to jointly bear the cargo 200, and the clamping portion 322B of the clamping jaw 322 protrudes out of the bearing surface of the object carrying arm 310, to keep the side wall 352 of the cargo 200 clamped. In this way, the automatic loading of the cargo 200 can be realized without using a pneumatic device or a hydraulic device to clamp and fix the cargo 200, which can reduce the loading cost and improve the loading effi-ciency. In addition, when the loading of the cargo 200 is completed, the second limiting member 380 can limit the position of the side wall 352 of the cargo 200, to prevent the cargo 200 from shaking.

It can be understood that the unloading process of the cargo 200 is opposite to the loading process of the cargo 200, and details are not described herein again. It should be noted that, when the cargo 200 is unloaded, since the clamping and bearing member is inclined outward by means of its own gravity with the rotating shaft 330 as a fulcrum when the cargo 200 leaves the object carrying arm 310, there is no need to perform an unloading operation on the clamping and bearing member, and the clamping and bearing member will not hinder the unloading of the cargo 200, which can improve the unloading efficiency.

Figure 5:
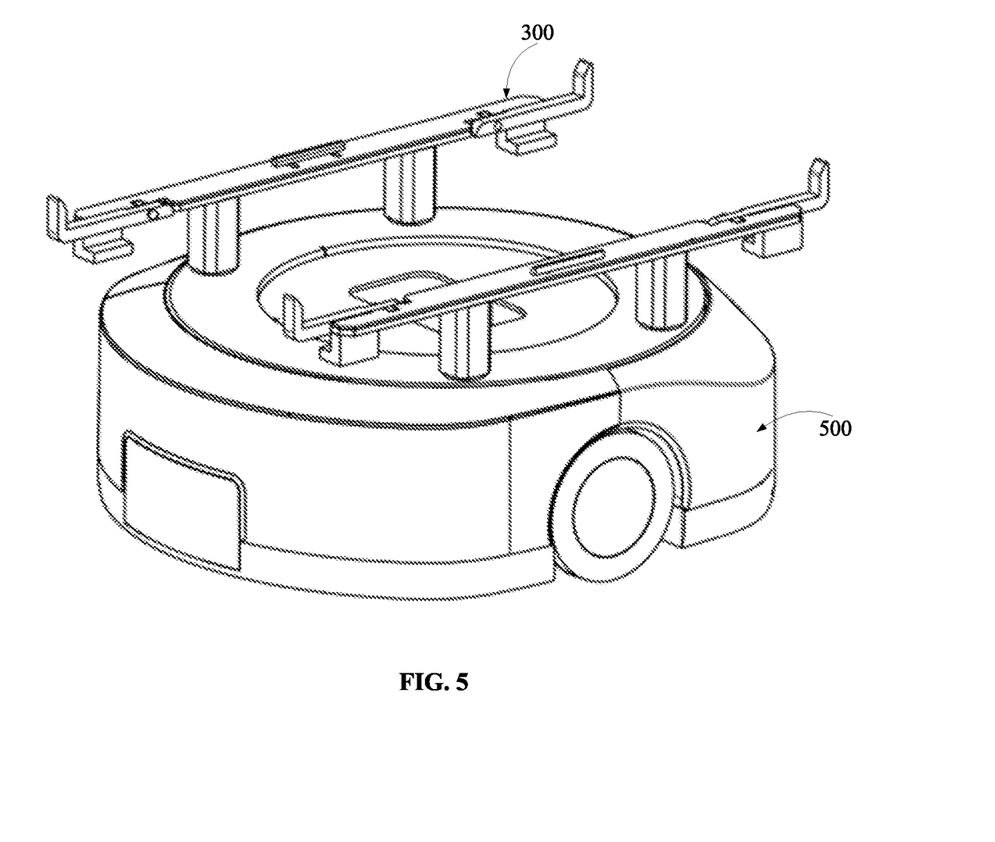
FIG. 5 shows a schematic structural diagram of a transfer robot according to an embodiment of the present disclosure.

An embodiment of the present disclosure further provides a transfer robot. As shown in FIG. 5, the transfer robot includes the object carrying assembly 300 of any one of the foregoing embodiments and the robot body 300. The robot body 500 can be an AGV (Automated Guided Vehicle, AGV for short) robot.

According to the object carrying assembly 300 and the transfer robot according to the embodiments of the present disclosure, two clamping and bearing members 320 are provided at two end portions of the object carrying arm 310, and the clamping and bearing members 320 are rotatably connected to a wall body of the object carrying arm 310.

When the object carrying arm 310 is not loaded, the bearing member 321 of the clamping and bearing member 320 is at least partially higher than the bearing surface of the object carrying arm 310 and the clamping jaw 322 is at least partially lower than the bearing surface of the object carrying arm 310, which is conducive to loading a cargo. When the object carrying arm 310 is loaded, the bearing member 321 is not higher than the bearing surface and the clamping jaw 322 is higher than the bearing surface, which is beneficial for the bearing member 321 and the object carrying arm 310 to jointly bear the cargo and the clamping jaw 322 to fix the cargo on the object carrying arm 310, thereby preventing the cargo from falling off due to an uneven ground surface or a fast carrying speed, which can improve the carrying efficiency. In addition, when the cargo is unloaded, the clamping jaw 322 naturally sinks by means of its own gravity, without performing an unloading operation on the clamping member, thus the unloading efficiency of the cargo is high.

Other constitutions of the object carrying assembly and the transfer robot in the foregoing embodiments can adopt various technical solutions known to those of ordinary skill in the art now and in the future, which will not be described in detail herein.

In the description of this specification, it should be understood that orientations or position relationships indi-cated by terms "center," "longitudinal," "lateral," "length," "width," "thickness," "up," "down," "front," "back," "left," "right," "vertical," "horizontal," "top," "bottom," "inner," "outer," "clockwise," "counterclockwise," "axial," "radial," "circumferential," and the like are based on the orientations or position relationships shown in the drawings, and are only for ease of describing the present disclosure and simplifying the description, rather than indicating or implying that the referred device or element must have a specific orientation, be configured and operated in a specific orientation, and therefore cannot be understood as a limitation of the present disclosure.

In addition, terms "first" and "second" are used for the purpose of description only, and are not to be understood as indicating or implying relative importance or implicitly indicating the number of technical features indicated. Thus, a feature defined by "first" or "second" can explicitly or implicitly include one or more of the features. In the description of the present disclosure, "a plurality of" means two or more, unless specifically defined otherwise.

In the present disclosure, unless specifically defined and limited otherwise, terms "installed," "linked," "connected," "fixed," and the like should be understood in a broad sense, for example, it can be a fixed connection, a detachable connection, or a whole; it can be a mechanical connection, an electrical connection, or a communication; it can be a direct link or an indirect link through an intermediary, and it can also be an internal connection between two elements or an interaction relationship between two elements. For a person of ordinary skill in the art, the specific meanings of the foregoing terms in the present disclosure can be understood according to specific circumstances.

In the present disclosure, unless specifically defined and limited otherwise, that the first feature is "above" or "below" the second feature can include direct contact of the first feature and the second feature, and can also include indirect contact through a further feature between them. Moreover, that the first feature is "above," "over," or "upward" the second feature includes the first feature being directly above and obliquely above the second feature, or it simply means that a horizontal height of the first feature is higher than that of the second feature. That the first feature is "below," "underneath," or "under" the second feature includes the first feature being directly below and obliquely below the second feature, or it simply means that a horizontal height of the first feature is lower than that of the second feature.

The foregoing disclosure provides many different implementations or examples for realizing different structures of the present disclosure. To simplify the disclosure of the present disclosure, components and settings of specific examples are described above. They are certainly only examples, and are not intended to limit the present disclosure. In addition, the present disclosure can repeat reference numerals and/or reference letters in different examples, and this repetition is for the purpose of simplification and clarity, and does not indicate relationships between various implementations and/or settings that are discussed.

What is described above are only specific implementations of the present disclosure, but the scope of protection of the present disclosure is not limited to this. Any person skilled in the art can easily think of various variations or substitutions within the scope of the technology disclosed in the present disclosure, which shall be covered in the protection scope of the present disclosure. Therefore, the protection scope of the present disclosure should be subject to the protection scope of the claims.

What is claimed is:

1. An object carrying assembly, comprising:
    an object carrying member, comprising two opposing boundary portions;
    a clamping and bearing member, arranged at each of the two boundary portions and rotatably connected to the object carrying member, wherein the clamping and bearing member is provided with a bearing member and a clamping jaw respectively on two sides of a rotating shaft,
    wherein, when the object carrying member is not loaded, the bearing member is at least partially higher than a bearing surface of the object carrying member; and when the object carrying member is loaded, the bearing member is not higher than the bearing surface and the clamping jaw is higher than the bearing surface, and wherein the object carrying member is provided with an accommodating opening that is communicated with the two opposing boundary portions and an outer wall of the clamping and bearing member is provided with a first rotating shaft hole; and
    a mounting seat comprising a convex portion and a pad portion vertically arranged, wherein the convex portion is accommodated in the accommodating opening and comprises a second rotating shaft hole opposite to the first rotating shaft hole, wherein the pad portion is mounted on the object carrying member and the rotating shaft is inserted into the first rotating shaft hole and the second rotating shaft hole.

2. The object carrying assembly of claim 1, wherein the object carrying member is an object carrying board, the two opposite boundary portions are two opposite side edges of the object carrying board, and each of the two opposite side edges of the object carrying board is provided with at least one mounting groove, and the clamping and bearing member is arranged in the mounting groove and is rotatably connected to a groove wall of the mounting groove.

3. The object carrying assembly of claim 2, wherein the accommodating opening is provided to communicate with the mounting groove in the object carrying board.

4. The object carrying assembly of claim 2, wherein the clamping and bearing member is provided with at least one weight reduction groove.

5. The object carrying assembly of claim 2, further comprising:
    a limiting member, wherein the limiting member is arranged below the mounting groove and is close to the clamping jaw, to limit a rotation position of the clamping jaw when the clamping jaw is not loaded.

6. The object carrying assembly of claim 2, further comprising:
    a plurality of boosting posts, wherein the boosting posts are arranged close to top corners of the object carrying board, and top ends of the boosting posts are respectively connected with a bottom surface of the object carrying board; and
    a chassis, wherein the chassis is connected with bottom ends of the plurality of boosting posts.

7. The object carrying assembly of claim 1, wherein the object carrying member is at least one object carrying arm, the two opposing boundary portions are end portions of the object carrying arm, there are two clamping and bearing members, and the two clamping and bearing members are arranged at the end portions of the object carrying arm respectively and are rotatably connected to a wall body of the object carrying arm.

8. The object carrying assembly of claim 7, wherein each of the end portions of the object carrying arm is provided with a mounting opening, and the clamping and bearing member is arranged at the mounting opening.

9. The object carrying assembly of claim 8, wherein the accommodating opening is provided to communicate with the mounting opening in the object carrying arm.

10. The object carrying assembly of claim 7, further comprising:
    a first limiting member, wherein the first limiting member is arranged below the object carrying arm and is close to the clamping jaw, to limit a rotation position of the clamping jaw when the clamping jaw is not loaded;
    a second limiting member, wherein the second limiting member is arranged on a middle portion of a top surface of the object carrying arm, a top portion of the second limiting member is formed with a second inclined surface, and the second inclined surface is inclined downward from a top end of the second limiting member to an inner side of the object carrying arm.

11. The object carrying assembly of claim 10, wherein an obround mounting hole is provided in a middle portion of the object carrying arm along a width direction of the object carrying arm, and the second limiting member is mounted on any position in the obround mounting hole.

12. The object carrying assembly of claim 7, further comprising:
a rubber pad, wherein the rubber pad is arranged on a top surface of the object carrying arm, and a shape of the rubber pad is adapted to a shape of the top surface of the object carrying arm.

13. The object carrying assembly of claim 7,
wherein the boosting posts are arranged close to the end portions of the object carrying arm, and top ends of the boosting posts are connected with a bottom surface of the object carrying arm.

14. The object carrying assembly of claim 1, wherein a distance between the rotating shaft and an end portion of the bearing member is smaller than a distance between the rotating shaft and an end portion of the clamping jaw; or, a center of gravity of the clamping and bearing member is set away from the rotating shaft.

15. The object carrying assembly of claim 1, wherein a center of gravity of the clamping and bearing member is set at an end portion of the clamping and bearing member away from the rotating shaft.

16. The object carrying assembly of claim 1, wherein the clamping jaw comprises a bearing portion and a clamping portion, the bearing portion is coplanar with the bearing member, the clamping portion protrudes out of a surface of the bearing portion from an end portion of the bearing portion away from the rotating shaft.

17. The object carrying assembly of claim 16, wherein a top portion of the clamping portion is formed with a first inclined surface, and the first inclined surface is inclined downward from a top end of the clamping portion to a side where the bearing member is located.

18. A transfer robot, comprising an object carrying assembly;
wherein the object carrying assembly comprise:
an object carrying member, comprising two opposing boundary portions;
a clamping and bearing member, arranged at each of the two boundary portions and rotatably connected to the object carrying member, wherein the clamping and bearing member is provided with a bearing member and a clamping jaw respectively on two sides of a rotating shaft,
wherein, when the object carrying member is not loaded, the bearing member is at least partially higher than a bearing surface of the object carrying member; and when the object carrying member is loaded, the bearing member is not higher than the bearing surface and the clamping jaw is higher than the bearing surface, and wherein the object carrying member is provided with an accommodating opening that is communicated with the two opposing boundary portions and an outer wall of the clamping and bearing member is provided with a first rotating shaft hole; and
a mounting seat, the mounting seat comprising a convex portion and a pad portion vertically arranged, wherein the convex portion is accommodated in the accommodating opening and comprises a second rotating shaft hole opposite to the first rotating shaft hole, wherein the pad portion is mounted on the object carrying member and the rotating shaft is inserted into the first rotating shaft hole and the second rotating shaft hole.

19. The transfer robot of claim 18, wherein the object carrying member is an object carrying board, the two opposite boundary portions are two opposite side edges of the object carrying board, and each of the two opposite side edges of the object carrying board is provided with at least one mounting groove, and the clamping and bearing member is arranged in the mounting groove and is rotatably connected to a groove wall of the mounting groove.

20. The transfer robot of claim 18, wherein the object carrying member is at least one object carrying arm, the two opposing boundary portions are end portions of the object carrying arm, there are two clamping and bearing members, and the two clamping and bearing members are arranged at the end portions of the object carrying arm respectively and are rotatably connected to a wall body of the object carrying arm.

* * * * *